United States Patent
Yamazaki

(10) Patent No.: US 8,532,385 B2
(45) Date of Patent: Sep. 10, 2013

(54) IMAGE PROCESSING APPARATUS AND IMAGE PROCESSING METHOD

(75) Inventor: Taeko Yamazaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 528 days.

(21) Appl. No.: 12/818,670

(22) Filed: Jun. 18, 2010

(65) Prior Publication Data

US 2010/0329551 A1 Dec. 30, 2010

(30) Foreign Application Priority Data

Jun. 24, 2009 (JP) ................... 2009-149799

(51) Int. Cl.
*G06K 9/34* (2006.01)
*G06K 9/00* (2006.01)
*G06K 9/48* (2006.01)
*G06K 9/36* (2006.01)

(52) U.S. Cl.
USPC .......... 382/176; 382/163; 382/164; 382/167; 382/200; 382/282

(58) Field of Classification Search
USPC .......... 382/176, 163, 164, 167, 200, 282
See application file for complete search history.

(56) References Cited

U.S. PATENT DOCUMENTS

| | | | |
|---|---|---|---|
| 6,404,921 B1 | 6/2002 | Ishida | |
| 7,133,565 B2 * | 11/2006 | Toda et al. | 382/243 |
| 8,041,135 B2 * | 10/2011 | Hosaki | 382/248 |
| 8,229,238 B2 * | 7/2012 | Matsumoto | 382/244 |
| 8,417,029 B2 * | 4/2013 | Ishida et al. | 382/166 |
| 2005/0180645 A1 * | 8/2005 | Hasegawa et al. | 382/239 |
| 2005/0238244 A1 | 10/2005 | Uzawa | |
| 2006/0204111 A1 * | 9/2006 | Koshi et al. | 382/229 |
| 2007/0154091 A1 * | 7/2007 | Toda | 382/172 |
| 2007/0230810 A1 * | 10/2007 | Kanatsu | 382/243 |
| 2007/0237394 A1 * | 10/2007 | Fujiwara | 382/182 |
| 2007/0262992 A1 * | 11/2007 | Ito | 345/467 |
| 2008/0095442 A1 * | 4/2008 | Ekin et al. | 382/187 |
| 2009/0245666 A1 * | 10/2009 | Yamashina | 382/235 |

FOREIGN PATENT DOCUMENTS

| | | |
|---|---|---|
| JP | 3026592 B2 | 3/2000 |
| JP | 2002-077633 A | 3/2002 |
| JP | 2005-346137 A | 12/2005 |
| JP | 2006-054712 A | 2/2006 |
| JP | 2007-019673 A | 1/2007 |
| JP | 2007-158510 A | 6/2007 |
| JP | 2007-272601 A | 10/2007 |
| JP | 2008-042346 A | 2/2008 |

* cited by examiner

*Primary Examiner* — Anand Bhatnagar
*Assistant Examiner* — Soo Park
(74) *Attorney, Agent, or Firm* — Canon USA Inc. IP Division

(57) ABSTRACT

An image processing apparatus includes a region analysis unit configured to generate a quantized region by integrating regions that are included in an input multivalued image and have similar colors and to determine an attribute of a connected component included in the generated quantized region, and a character portion filling unit configured to determine a color used for filling a connected component that has been determined by the region analysis unit to have a character attribute and to execute processing for filling the connected component that has been determined to have the character attribute. In the image processing apparatus, the character portion filling unit is configured to change a method for determining the color used for filling based on the quantized region existing adjacent to the connected component determined to have the character attribute.

9 Claims, 13 Drawing Sheets

FIG.4
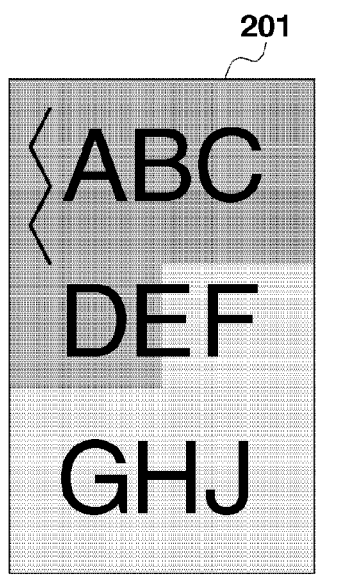
INPUT MULTIVALUED
IMAGE
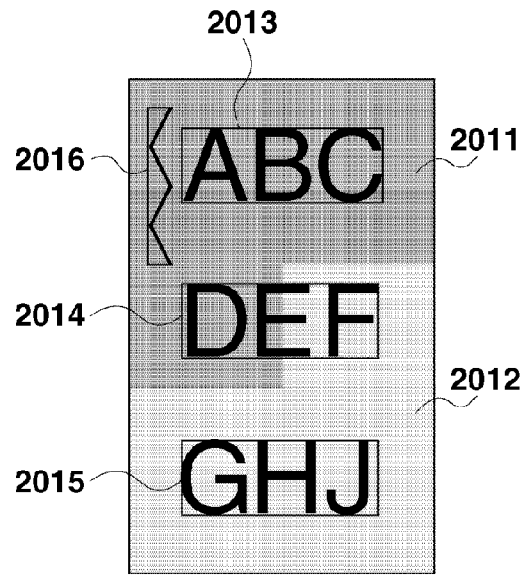
RESULT OF
COLOR-QUANTIZED
REGIONS
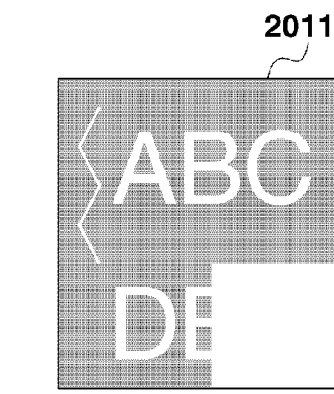
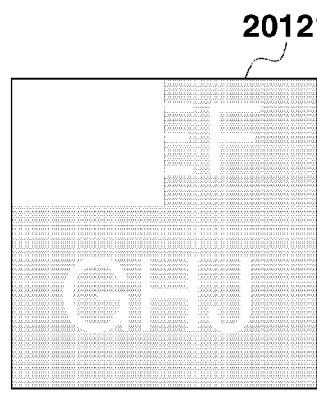
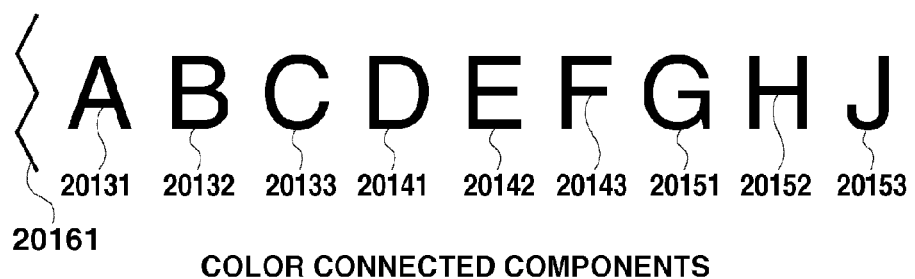
COLOR CONNECTED COMPONENTS

FIG.6A

| ID | LOCATION | COLOR | ATTRIBUTE | SURROUNDING QUANTIZED REGION |
|---|---|---|---|---|
| 2011 | #,# | xx | MULTICOLOR BACKGROUND | NONE |
| 2012 | #,# | yy | SINGLE-COLOR BACKGROUND | NONE |
| 2013 | #,# | zz | TEXT | 2011 |
| 2014 | #,# | zz | TEXT | 2011,2012 |
| 2015 | #,# | zz | TEXT | 2012 |
| 2016 | #,# | zz | TEXT | 2011 |

FIG.6B

| ID | LOCATION | ATTRIBUTE | SURROUNDING COLOR CONNECTED COMPONENT | ORIGINAL QUANTIZED REGION |
|---|---|---|---|---|
| 20111 | #,# | BACKGROUND | NONE | 2011 |
| 20121 | #,# | BACKGROUND | NONE | 2012 |
| 20131 | #,# | TEXT | 20111 | 2013 |
| 20132 | #,# | TEXT | 20111 | 2013 |
| 20133 | #,# | TEXT | 20111 | 2013 |
| 20141 | #,# | TEXT | 20111 | 2014 |
| 20142 | #,# | TEXT | 20111,20121 | 2014 |
| 20143 | #,# | TEXT | 20121 | 2014 |
| 20151 | #,# | TEXT | 20121 | 2015 |
| 20152 | #,# | TEXT | 20121 | 2015 |
| 20153 | #,# | TEXT | 20121 | 2015 |
| 20161 | #,# | LINE DRAWING | 20111 | 2016 |

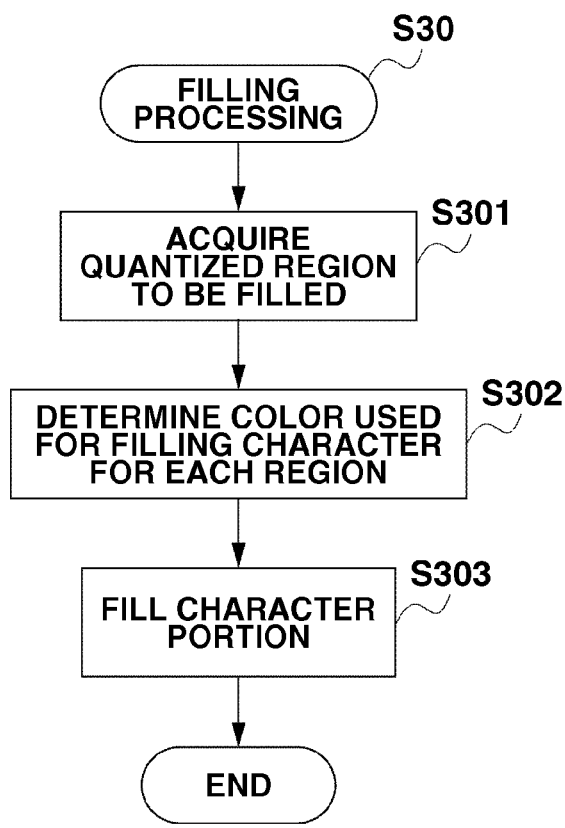

FIG.10

```
<Document>
 <Layout>
 <image src=./background.png/>
   <Vector>
    <Path d="M629 30.510.5 0.512 111 115
2.511 1v11-6.0 1h-5.0v11...1-1.0 0.5z"/>
    <Path d="M648.5 31.5h5v11-1.0 1h-
1.0v11-1.0... 7h8v-6.0h-8.0z"/>
    <Path d="M49 1.51-0.5 110.5 112.5-
2.511 -0.5h511... 1-0.5 0.5z"/>
    <Path d="64 1h32v48c0 2 0 2 -4.0 2h-
6.0v-5.0h5v-13.0h-22.0v4c0 3.3... 22h22v-
8.0h-22.0z"/>
...
   </Vector>
 </Layout>
</Document>
```

IMAGE PROCESSING APPARATUS AND IMAGE PROCESSING METHOD

BACKGROUND OF THE INVENTION

1. Field of the Invention

The present invention generally relates to image processing and, more particularly, to an image processing apparatus configured to execute processing for filling a character image portion.

2. Description of the Related Art

In recent years, electronic information has been widely used. More specifically, a conventional system has been widespread that scans an image of a document by using a scanner and acquires and stores image data of the scanned document instead of merely filing a copy of the document printed on paper. A conventional system like this can transmit the acquired electronic data (image) of the document to another apparatus.

Meanwhile, it is desired by the market, in order to reduce costs of transmitting and storing electronic data, that an electronic document be compressed at a high compression ratio. In addition, it is also desired by the market that electronic data can be partially edited and reused. Furthermore, it is yet also desired that electronic image data have such a high image quality that cannot be degraded by either enlargement or reduction.

In compressing an image of a document mixedly including text regions and photo regions, if image data of a document like this is compressed by a lossless compression method, a high image quality can be achieved while the compression ratio cannot become sufficiently high. On the other hand, if image data of such a document is compressed by a lossy compression method (Joint Photographic Experts Group (JPEG) or the like), a sufficiently high compression ratio can be achieved while the image quality of a text region may be degraded.

In order to address these problems, a conventional method segments an electronic document image into text regions, line drawing regions, and photo regions and compresses each region by using a compression method appropriate for the type of each region. More specifically, Japanese Patent Application Laid-Open No. 2002-077633 extracts a text region and Modified Modified Read (MMR)—compresses the extracted text region. Furthermore, this conventional method colors a text region of an original image with a color used in a surrounding portion and reduces the size of the image data. In addition, the conventional method JPEG-compresses the data and generates a portable document format (PDF) file based on the compressed data.

Japanese Patent Application Laid-Open No. 2002-077633 discusses a method for generating a binary image based on an image to be processed, extracting a text region based on an aggregate of pixels of the binary image, and colors the extracted text region with an average color of surrounding pixels.

In addition, Japanese Patent Application Laid-Open No. 2007-272601 converts a text region and a line drawing region into vector data, JPEG-compresses regions other than text regions, which cannot be easily reproduced by vectorization (i.e., a photo region or the like), combines compressed data of the regions into one electronic file, and outputs the electronic file.

Color information of pixels surrounding a text region is easily affected by bleeding that may occur around pixels of a character included in the text region. Accordingly, as discussed in Japanese Patent Application Laid-Open No. 2002-077633, in order to determine a color used for filling a text region in generating a background image excluding text regions, it is necessary to acquire color information of a large number of pixels and calculate an average of the acquired color information.

However, in this case, it takes time for executing processing for calculating an average color for each character image. In addition, a background of a text region may not always be filled in a single color. More specifically, if a background of a text region is filled in a plurality of colors (in gradation, for example), it is not very effective to calculate and use an average color.

SUMMARY OF THE INVENTION

According to an aspect of the present invention, an image processing apparatus includes a region analysis unit configured to generate a quantized region by integrating regions that are included in an input multivalued image and have similar colors and to determine an attribute of a connected component included in the generated quantized region, and a character portion filling unit configured to determine a color used for filling a connected component that has been determined by the region analysis unit to have a character attribute and to execute processing for filling the connected component that has been determined to have the character attribute. In the image processing apparatus, the character portion filling unit is configured to change a method for determining the color used for filling based on the quantized region existing adjacent to the connected component determined to have the character attribute.

According to an exemplary embodiment of the present invention, by executing processing for filling a character portion with an appropriate color for each text region, character filling processing can be implemented that can achieve a high processing speed and a high image quality at the same time.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 4 illustrates an example of an image to be processed.

FIGS. 6A and 6B illustrate information about quantized regions and information about color connected components, respectively.

FIG. 7 is a flow chart illustrating an exemplary flow of character portion filling processing according to the first exemplary embodiment.

FIG. 10 illustrates an example of an electronic file to be generated.

DESCRIPTION OF THE EMBODIMENTS

Various exemplary embodiments, features, and aspects of the invention will be described in detail below with reference to the drawings.

In a first exemplary embodiment of the present invention, a color input image is quantized for each similar color and subjected to region analysis. The present exemplary embodiment changes a method for determining a character portion filling color to be used in a text region based on a result of the region analysis.

Figure 1:
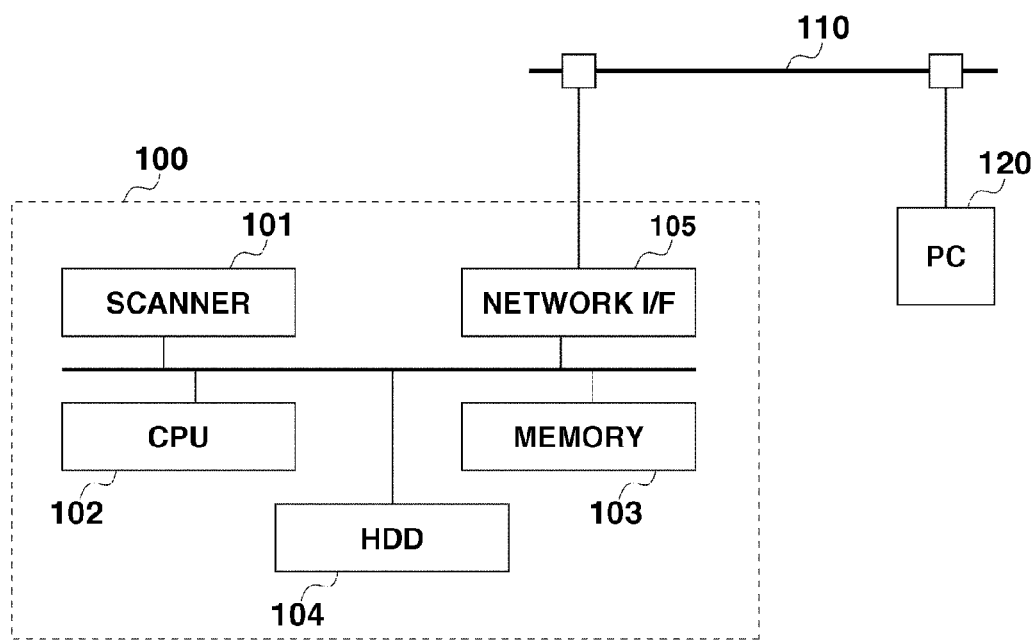
FIG. 1 is a block diagram illustrating an exemplary configuration of a system according to a first exemplary embodiment of the present invention.

FIG. 1 is a block diagram illustrating an exemplary configuration of a system according to the present exemplary embodiment. Referring to FIG. 1, an image processing apparatus 100 includes a scanner 101, a central processing unit (CPU) 102, a memory 103, a hard disk 104, and a network interface (I/F) 105.

The scanner 101 reads an image of a paper document and generates image data of the read document. The CPU 102 executes a computer program for performing image processing on image data. The memory 103 functions as a work memory for the CPU 102 in executing a computer program. Furthermore, the memory 103 is used as a temporary storage area for temporarily storing data to be processed.

The hard disk 104 is a storage unit that stores the computer program and data. The network I/F 105 is an interface between the image processing apparatus 100 and an external apparatus for transmitting and receiving data via a network 110.

In the present exemplary embodiment, the computer program is stored on the hard disk 104. However, the present exemplary embodiment is not limited to this. More specifically, it is also useful if the computer program is stored on a computer-readable storage medium. Alternatively, it is also useful if the computer program is downloaded and executed via the network 110.

Figure 2:
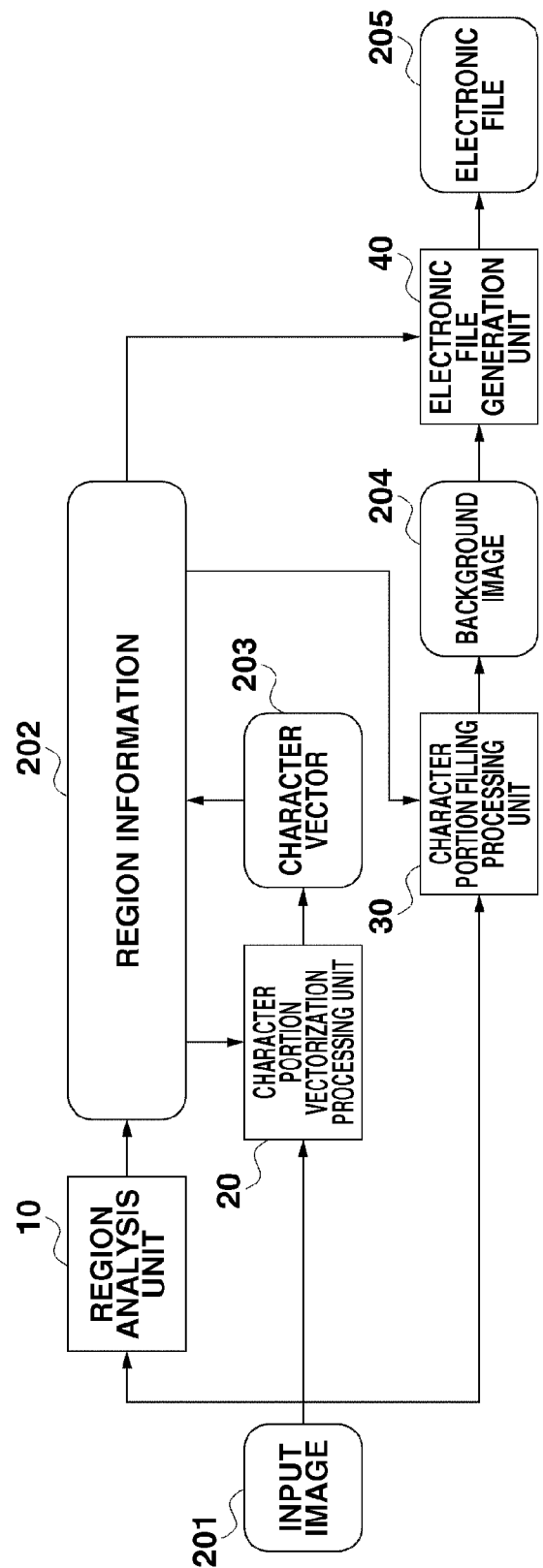
FIG. 2 is a block diagram illustrating an exemplary configuration of an image processing unit according to the first exemplary embodiment.

In addition, in the present exemplary embodiment, a function of each processing unit illustrated in FIG. 2 is implemented by a computer by executing the computer program. However, the present exemplary embodiment is not limited to this. More specifically, it is also useful if a part of or the entire processing unit is implemented by hardware such as an electric circuit.

A personal computer (PC) 120 is connected to the image processing apparatus 100 via a network such as a local area network (LAN) 110. The PC 120 receives data transmitted from the image processing apparatus 100.

FIG. 2 illustrates an exemplary configuration of the image processing unit, which executes the image processing according to the present exemplary embodiment. In the present exemplary embodiment, each of processing units 10 through 40 is implemented by the CPU 102 executing the computer program. However, the present exemplary embodiment is not limited to this. More specifically, it is also useful if a part of or the entire processing unit is implemented by an electric circuit.

Referring to FIG. 2, the image processing unit includes a region analysis unit 10, a character portion vectorization processing unit 20, a character portion filling processing unit 30, and an electronic file generation unit 40.

In addition, an input image 201, region information 202, a character vector 203, a background image 204, and an electronic file 205 are generated or processed by the above-described processing units, respectively.

Furthermore, the memory 103 includes a temporary storage area (memory) for temporarily storing the above-described data 201 through 205, which is generated by the processing unit illustrated in FIG. 2. Moreover, the memory 103 includes a work memory necessary for the computer to function as the processing units 10 through 40.

Figure 3:
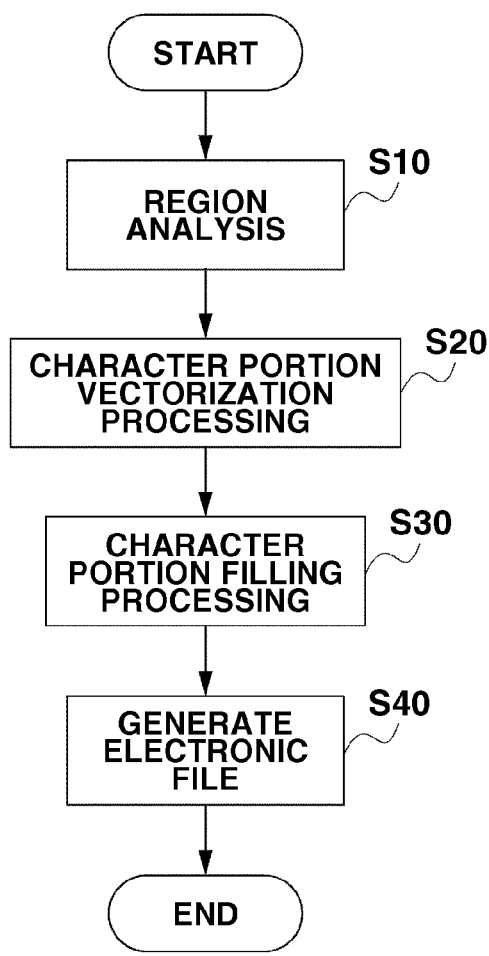
FIG. 3 is a flow chart illustrating an exemplary flow of image processing according to the first exemplary embodiment.

FIG. 3 is a flow chart illustrating an exemplary flow of image processing executed by each processing unit illustrated in FIG. 2. Referring to FIG. 3, in step S10, the region analysis unit 10 executes region analysis processing. More specifically, by executing the region analysis processing, the region analysis unit 10 segments the input image (multivalued image) 201 into a plurality of regions, such as character portions (text region) and graphic portions (graphic region). By executing the region analysis processing, the region analysis unit 10 acquires the region information 202.

In step S20, the character portion vectorization processing unit 20 identifies and extracts, from the input image 201, the text region to be processed based on the region information 202. In addition, the character portion vectorization processing unit 20 detects a contour of the character portion included in the text region.

Furthermore, the character portion vectorization processing unit 20 executes vectorization processing on the character portion. By executing the above-described processing, the character portion vectorization processing unit 20 converts an image of a character into vector data (the character vector 203).

In step S30, the character portion filling processing unit 30 executes processing for filling the character portion in the text region (processing for coloring a portion of the input image 201 that includes a character image with the background color) to generate the background image 204.

In step S40, the electronic file generation unit 40 combines the region information 202, the character vector 203, and the background image 204 and generates the electronic file 205. The processing illustrated in each of FIGS. 2 and 3 will be described in detail below. In the following description, the input image 201 illustrated in FIG. 4 will be described as an example.

In step S10, the region analysis processing unit 10 extracts a text region and a graphic region from the input multivalued image 201 and segments the input image 201 into regions. In the present exemplary embodiment, the region analysis unit 10 executes the region analysis processing by using a publicly known method for segmenting a color multivalued image into segments, such as a method discussed in International Publication WO 2006/066325.

Figure 5A:
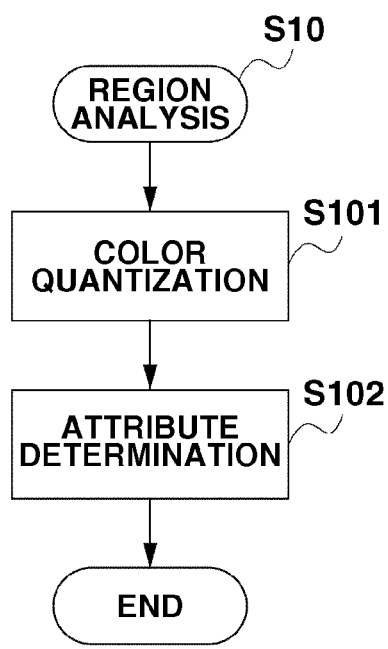
FIGS. 5A and 5B are flow charts illustrating an exemplary flow of region analysis processing and attribute determination processing, respectively, according to the first exemplary embodiment.

FIG. 5A is a flow chart illustrating an example of the region analysis processing executed by the region analysis unit 10.

Referring to FIG. 5A, in step S101, the region analysis processing unit 10 color-quantizes an input color multivalued image. In addition, the region analysis unit 10 integrates the regions having similar colors. Furthermore, the region analysis unit 10 segments the regions into a plurality of regions.

In step S102, the region analysis unit 10 determines an attribute of each region acquired by the color-quantization in step S101. More specifically, in the present exemplary embodiment, each area has a character attribute, a graphic attribute, a page background attribute, or the like.

Figure 5B:
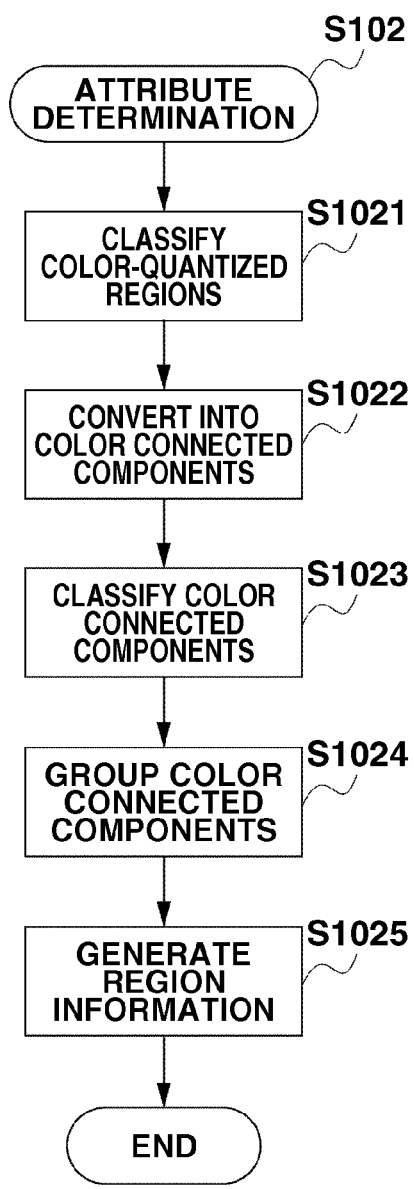

FIG. 5B is a flow chart illustrating an example of processing for determining an attribute in step S102. Referring to FIG. 5B, in step S1021, the region analysis processing unit 10 broadly classifies the regions according to attributes thereof based on statistics calculated from each region acquired by the above-described color quantization. The statistics can include the size of a region, a color distribution, and the like. In the present exemplary embodiment, it is presumed that the region analysis unit 10 classifies the regions into text, single background, photo, and multicolor regions.

More specifically, the region analysis unit 10 classifies a region whose change of color is small (i.e., a region whose color distribution range is small) and whose area is not so large as a text region. In the present exemplary embodiment, it is presumed that in classifying the regions, the text region includes a line drawing region and a table region.

Furthermore, the region analysis unit 10 classifies a region whose change of color is small and whose area on a page is large into a single background region. In addition, the region analysis unit 10 classifies a region whose change of color is great and whose area is not so large into a photo region. More specifically, in the present exemplary embodiment, the region analysis unit 10 recognizes a photo region as significant as a foreground.

Furthermore, the region analysis unit 10 classifies a region whose change of color is great and whose area on a page is also large into a multicolor background.

In the example illustrated in FIG. 4, regions 2011 through 2016 are a result of segmenting the input image 201 into quantized regions. Each of the regions 2011 through 2016 is a region integrated based on a representative color, which is acquired as a result of the color quantization.

FIG. 6A illustrates exemplary detailed information about each quantized region. Referring to FIG. 6A, if the region 2011 includes gradation, the region analysis unit 10 classifies the region 2011 as a multicolor background region because the region 2011 includes a color change (i.e., because the region 2011 has a large color distribution range) and the area thereof is large.

If the region 2012 includes no color change, the region analysis unit 10 classifies the region 2012 as a single-color background because the area thereof is large. Furthermore, in the present exemplary embodiment, it is presumed that each of the regions 2013 through 2016 has been classified as a text region. In this state, the region analysis unit 10 executes the processing in step S1022 illustrated in FIG. 5B.

In step S1022, the region analysis processing unit 10 converts the quantized region into a color pixel connected component. In the present exemplary embodiment, the "color pixel connected component" refers to a group of pixels having the same representative color and connected (contacting one another) in a vertical, horizontal, or oblique direction.

In step S1023, the region analysis processing unit 10 further detailedly classifies each color connected component based on statistics of each connected component. In the present exemplary embodiment, the "statistics of each connected component" includes the size of a circumscribed rectangle, the number of pixels, the length of a border between connected components, and an average color of each connected component.

In step S1024, the region analysis processing unit 10 determines a surrounding relationship among color connected components and groups the color connected components. In step S1025, the region analysis unit 10 generates the region information 202 based on the grouped connected components.

The region information 202 includes various pieces of information about each color connected component, such as an identification (ID), attribute information (information about whether the component is a character, line drawing, photo, table, frame, or page background component), positional information, color information, the surrounding relationship of the connected components. In addition, the region information 202 includes information about a quantized region, which is the origin of conversion of a color connected component.

Each of connected components 20111 through 20161 illustrated in FIG. 4 is a color connected component extracted as a result of converting the color quantized regions into color connected components and grouping the color connected components. FIG. 6B illustrates an example of the region information 202 related to the color connected component.

In the region information 202 illustrated in FIG. 6B, the color connected component 20111 and 20121 are classified as a region having the background attribute. More specifically, the color connected component 20111 has the multicolor background attribute while the color connected component 20121 has the single-color background. Furthermore, the color connected components 20131 through 20153 are classified as a region having the character attribute. Moreover, the color connected component 20161 is classified as a region having the line drawing attribute.

In step S20, the character portion vectorization processing unit 20 (FIG. 3) executes vectorization processing for converting the character portion (i.e., a connected component having the character attribute) into vector data. The processing for vectorizing a character portion will be described in detail below.

The character portion vectorization processing unit 20 acquires a connected component having the character attribute from the region information 202. In addition, the character portion vectorization processing unit 20 converts the contour of the connected component into vector data by using a publicly known vectorization method. In the above-described vectorization processing, the character portion vectorization processing unit 20 according to the present exemplary embodiment uses the methods discussed in Japanese Patent No. 3026592 and Japanese Patent Application Laid-Open No. 2005-346137.

More specifically, the method discussed in Japanese Patent No. 3026592 rasterizes and scans an image and detects inter-pixel vectors in the horizontal and vertical directions based on a focused pixel and pixels existing in the proximity of the focused pixel. In addition, the method discussed in Japanese Patent No. 3026592 extracts the contour of image data based on the state of connection among the inter-pixel vectors. Thus, the method discussed in Japanese Patent No. 3026592 generates information in which the periphery of connected pixel data, which is so-called an "outline vector", is described based on a group of inter-pixel vectors.

In addition, the method discussed in Japanese Patent Application Laid-Open No. 2005-346137 approximates the outline vector by on a straight line or two-dimensional or three-dimensional Bezier curve. Thus, the method discussed in Japanese Patent Application Laid-Open No. 2005-346137 generates vector-described data having a high image quality that is not affected by greatly enlarging the image thereof.

By executing the above-described processing, the character portion vectorization processing unit 20 generates the character vector 203. The character vector 203 generated by the character portion vectorization processing unit 20 is added to the region information 202.

The character portion filling processing unit 30 executes processing for filling a character portion in a background image, which is colored in a single color or multicolor (pixel value conversion processing). Now, the character portion filling processing according to the present exemplary embodiment will be described in detail below.

FIG. 7 is a flow chart illustrating an exemplary flow of the character portion filling processing in step S30, which is executed by the character portion filling processing unit 30 according to the present exemplary embodiment.

Referring to FIG. 7, in step S301, the character portion filling processing unit 30 acquires a quantized region, which is to be subjected to the character portion filling processing. In the present exemplary embodiment, a character-vectorized portion, i.e., a pixel located at a location corresponding to a connected component having the character attribute, is to be subjected to the character portion filling processing. Accordingly, the regions 2013 through 2015 illustrated in FIG. 4, which includes locations corresponding to the connected component having the character attribute, are to be subjected to the character portion filling processing.

In step S302, the character portion filling processing unit 30 determines a character filling color to be used for the location corresponding to each connected component.

Figure 8:
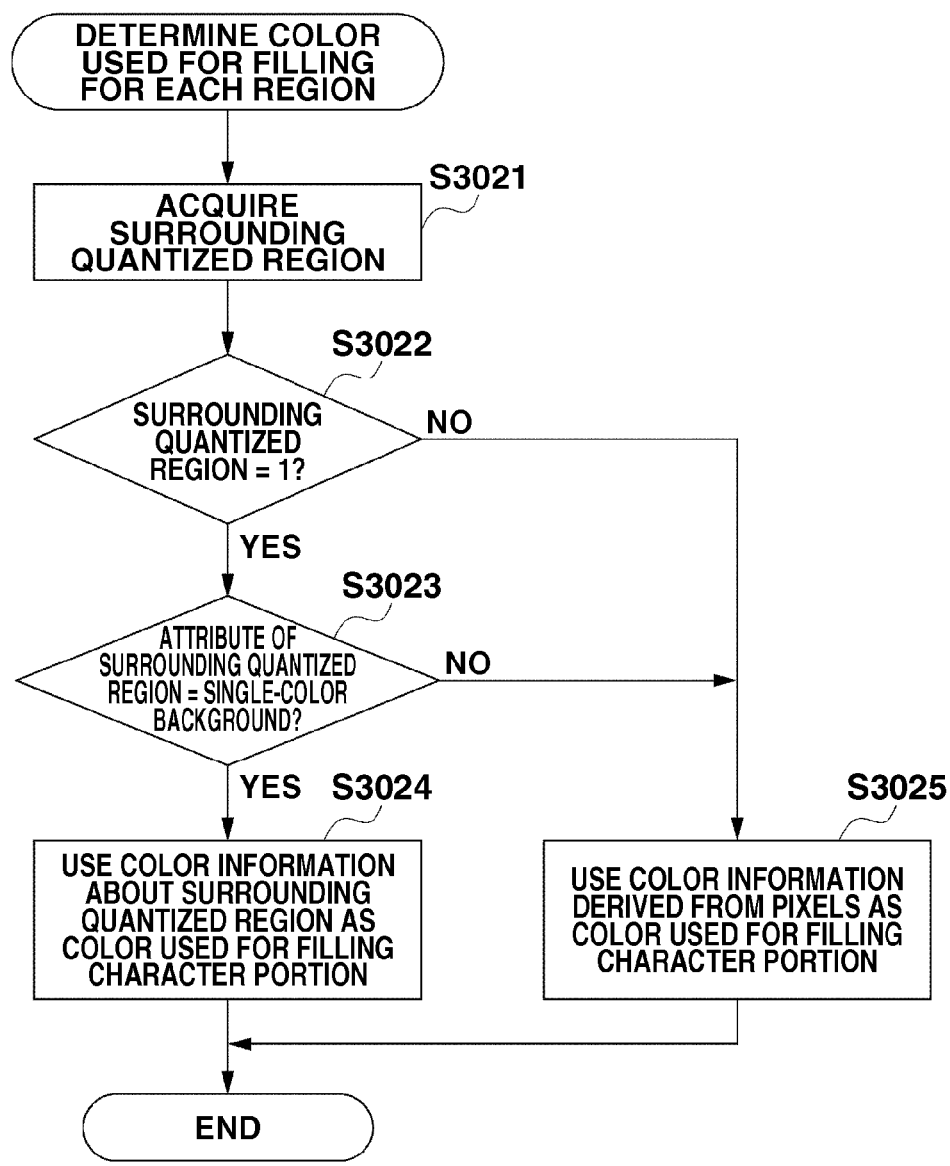
FIG. 8 is a flow chart illustrating an exemplary flow of character filling color determination processing according to the first exemplary embodiment.

FIG. 8 is a flow chart illustrating an exemplary flow of the character filling color determination processing executed by the character portion filling processing unit 30 according to the present exemplary embodiment.

Referring to FIG. 8, in step S3021, the character portion filling processing unit 30 acquires the quantized region of the background existing adjacent to the quantized region to be processed (the connected component having the character attribute).

More specifically, in step S3021, the character portion filling processing unit 30 acquires the quantized region existing in the proximity of and surrounding (including) the connected component having the character attribute. Then, the processing advances to step S3022.

In the example illustrated in FIG. 4, the region 2011 is the quantized region surrounding the connected component in the region 2013, which has the character attribute. In other words, in the example illustrated in FIG. 4, the region 2011 is the quantized region existing adjacent to the connected component having the character attribute.

In step S3022, the character portion filling processing unit 30 determines whether only one surrounding quantized region exists adjacent to the region to be processed. If it is determined that only one surrounding quantized region exists adjacent to the region to be processed (YES in step S3022), then the processing advances to step S3023. On the other hand, if it is determined that two or more surrounding quantized region exist adjacent to the region to be processed (NO in step S3022), Then, the processing advances to step S3025.

More specifically, in the example illustrated in FIG. 4, the region 2011 is the only quantized region existing adjacent to the connected component having the character attribute included in the quantized region 2013. Furthermore, the region 2012 is the only quantized region existing adjacent to the connected component included in the quantized region 2015. In other words, the number of the surrounding quantized region exists adjacent to the region to be processed in each such case is only one. Accordingly, in this case, the processing advances to step S3023.

On the other hand, two quantized regions, namely, the regions 2011 and 2012, surround the connected component having the character attribute included in the quantized region 2014. Accordingly, the processing advances to step S3025.

In step S3023, the character portion filling processing unit 30 determines whether the attribute of the surrounding quantized region is the single-color background attribute. More specifically, in step S3023, the character portion filling processing unit 30 determines whether the surrounding quantized region is the quantized region having a small color change.

If it is determined that the attribute of the surrounding quantized region is the single-color background attribute (YES in step S3023), then the processing advances to step S3024. On the other hand, if it is determined that the attribute of the surrounding quantized region is the multicolor background attribute (NO in step S3023), then the processing advances to step S3025.

More specifically, for the quantized region 2011, which surrounds the quantized region 2013, has the multicolor background attribute. Accordingly, in this case, it is determined "NO" in step S3023 and thus the processing advances to step S3025. For the quantized region 2012, which surrounds the quantized region 2015, has the single-color background attribute. Accordingly, in this case, it is determined "YES" in step S3023 and thus the processing advances to step S3024.

In step S3024, the character portion filling processing unit 30 determines to use color information about (the representative color of) the surrounding quantized region as a character pixel filling color. More specifically, for pixels located at locations corresponding to the color connected components 20151 through 20153, which are included in the quantized region 2015, the character portion filling processing unit 30 uses the color information yy (FIG. 6A), which is included in the surrounding quantized region 2012 having the single-color background attribute.

In step S3025, the character portion filling processing unit 30 uses pixel-derived color information as a character portion filling color. In the present exemplary embodiment, the "pixel-derived color information" refers to an average color calculated by averaging pixels surrounding connected components segmented based on the surrounding quantized region.

Figure 9:
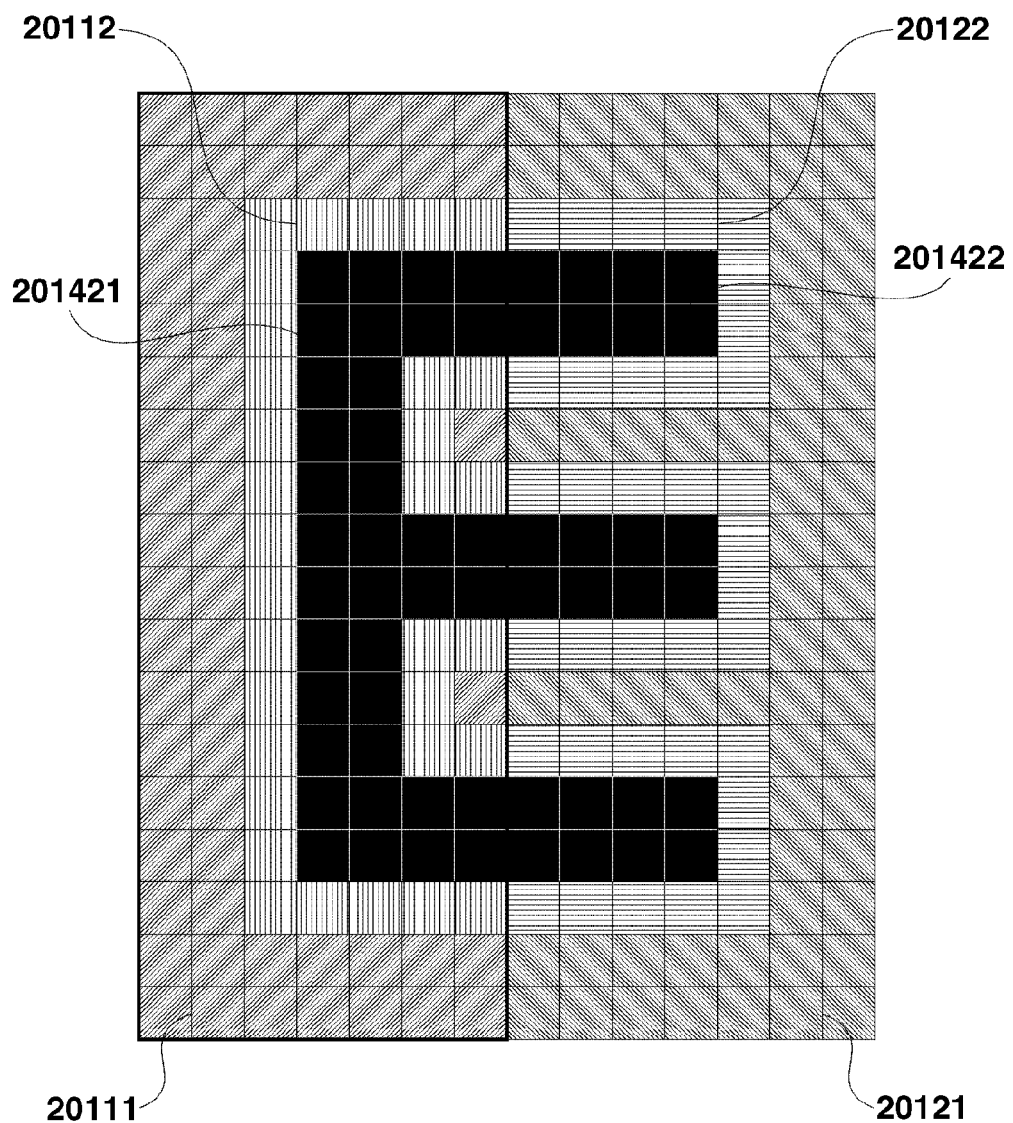
FIG. 9 illustrates an example of a method for determining pixel-derived color information.

FIG. 9 illustrates an example of a portion including a character "E" (the color connected component 20142), which is included in the quantized region 2014, and surrounding portions thereof in a magnified scale.

Referring to FIG. 9, the quantized regions 20111 and 20121 surround and include the color connected component 20142. In this state, the character portion filling processing unit 30 vertically segments the connected component 20142 into halves (regions 201421 and 201422) across the boundary between the surrounding quantized regions 20111 and 20121.

In addition, the character portion filling processing unit 30 uses an average color of the surrounding pixels 20112 of the connected component 201421 included in the quantized region 20111 as the color for filling the segmented connected component 201421.

Similarly, for the segmented connected component 201422, the character portion filling processing unit 30 uses an average color of surrounding pixels 20122 of the connected component 201422, which is included in the quantized region 20121, as the character portion filling color.

The character portion filling processing unit 30 executes similar processing for each character color connected component existing within the quantized region and determines the character portion filling color. For the quantized regions 2013 and 2014, the character portion filling processing unit 30 uses the pixel-derived color information as the character portion filling color.

In step S303 (FIG. 7), the character portion filling processing unit 30 uses the character filling color determined in step S302 to color the character pixel portion and generates a background image 204.

In step S40 (FIG. 3), the electronic file generation unit 40 integrates the region information 202 and the background image 204 generated in the above-described manner to generate an electronic file 205. More specifically, the electronic file generation unit 40 integrates the character vector, which is generated as a result of the vectorization and conversion by the character portion vectorization processing unit 20, the information about the location at which the character vector is to be reproduced, and the background image 204. Then, the electronic file generation unit 40 converts the integrated data into an electronic file of a format with which the electronic file can be reproduced or edited on the PC 120. PDF or eXtended Markup Language (XML) can be used as the format of such an electronic file.

FIG. 10 illustrates an example of the electronic file 205, which has been virtually generated in the XML format. In the example illustrated in FIG. 10, the XML format of the electronic file 205 is appropriately simplified for easier understanding.

Referring to FIG. 10, the background image 204 is an image corresponding to a description "background.png", which is included in an "image" tag. The character vector 203 corresponds to each "Path", which is included in a "Vector" tag.

As described above, the present exemplary embodiment changes the method for determining the character portion filling color according to the state of the surrounding quantized region.

More specifically, with respect to the quantized region existing adjacent to the connected component having the character attribute, if only one quantized region has the single-color background attribute, then the present exemplary embodiment executes the character portion filling processing by using the representative color of the quantized region having the single-color background attribute without calculating an average color of a portion surrounding the character connected component.

Therefore, the present exemplary embodiment can improve the processing speed because the character portion filling color can be determined by one operation in the unit of a text region. Furthermore, the present exemplary embodiment can use a color as similar as possible to the color of the background as the character portion filling color, which is not so much affected by bleeding that may occur around character pixels.

If two or more quantized regions exist adjacent to the character connected component (i.e., if the quantized regions existing adjacent to the character connected component has the multicolor background attribute), then the present exemplary embodiment segments the data into surrounding quantized regions, calculates an average value of a portion surrounding the character pixels, and uses the average color calculated in this manner as the character portion filling color. Accordingly, the present exemplary embodiment can fill the character portion with the appropriate color even if the background has a mixed attribute.

Now, a second exemplary embodiment of the present invention will be described in detail below. In the first exemplary embodiment described above, the method for determining the character portion filling color is changed in the unit of a region. However, it is also useful if the method for determining the character portion filling color is changed in the unit of a character connected component.

Figure 11:
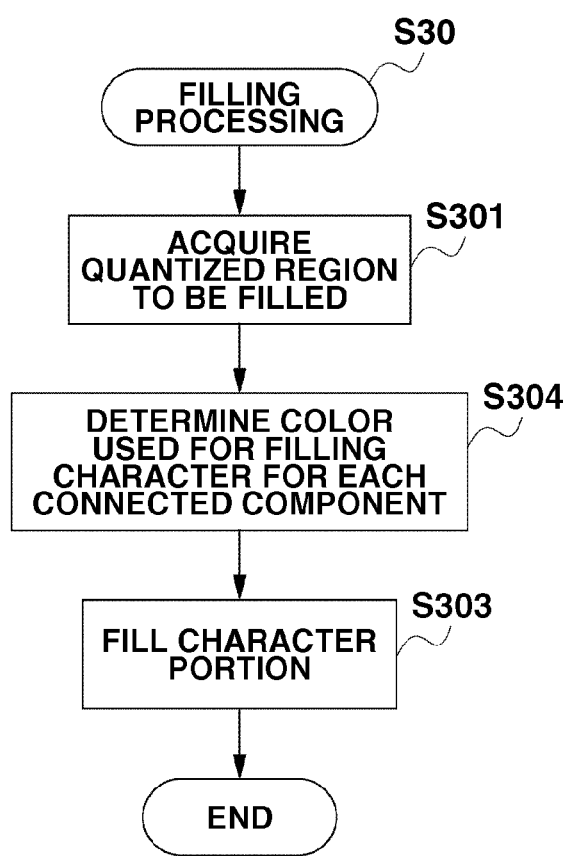
FIG. 11 is a flowchart illustrating an exemplary flow of character portion filling processing according to a second exemplary embodiment of the present invention.
Figure 12:
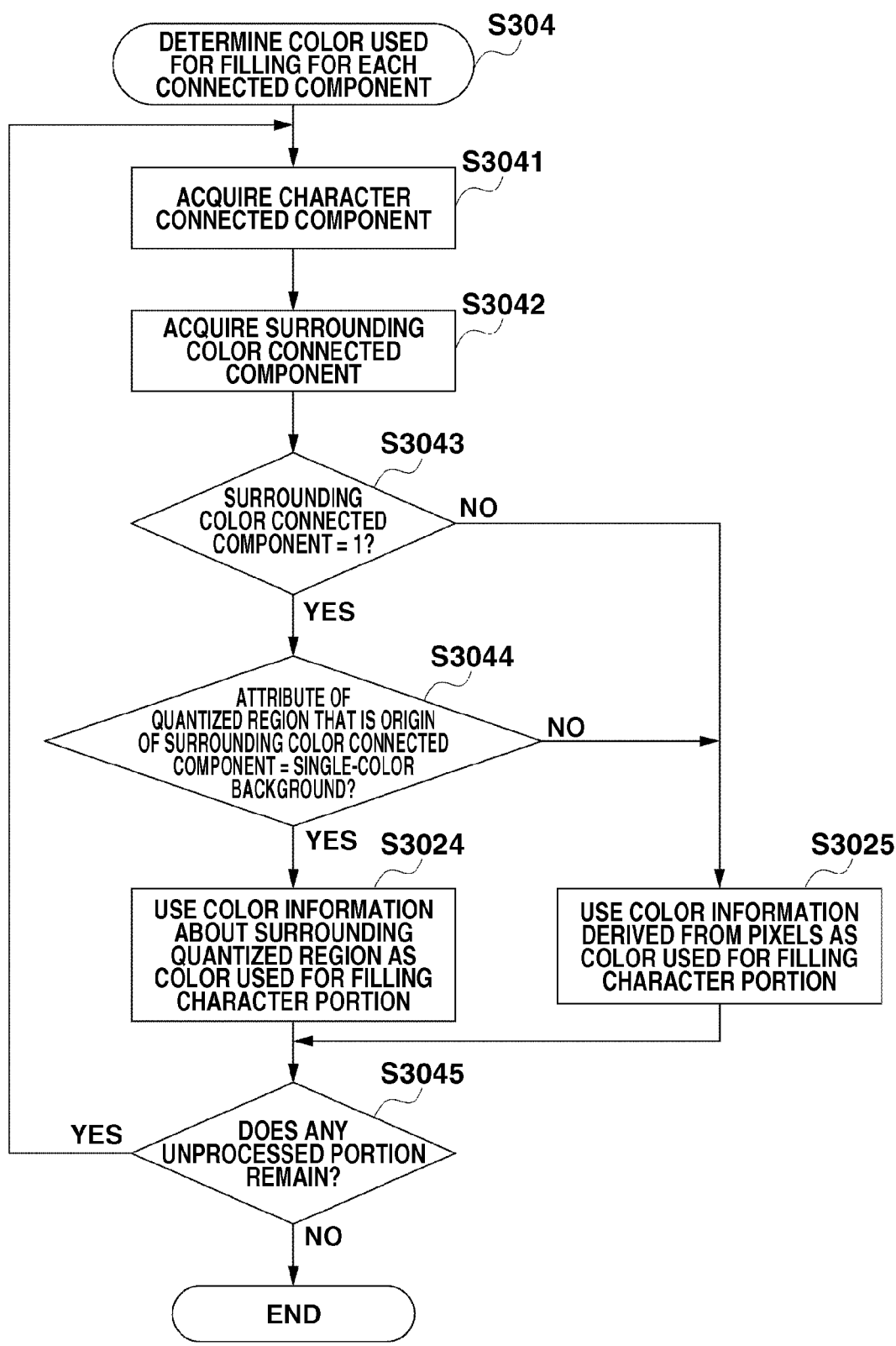
FIG. 12 is a flowchart illustrating an exemplary flow of character filling color determination processing according to the second exemplary embodiment.

Each of FIGS. 11 and 12 are a flow chart illustrating an exemplary flow of character portion filling processing according to the second exemplary embodiment. In the present exemplary embodiment, units, components, and processing that are similar to those of the first exemplary embodiment are provided with the same reference numerals and symbols. Accordingly, the description thereof will not be repeated here.

Referring to FIG. 11, in step S301, the character portion filling processing unit 30 identifies and extracts a quantized region having the character attribute, which is to be subjected to character portion filling processing. Then the processing advances to step S304. In step S304, the character portion filling processing unit 30 determines the character portion filling color in the unit of a color connected component. In step S303, the character portion filling processing unit 30 fills the character portion with the character portion filling color determined in step S304.

The processing in step S304 will be described in detail below with reference to FIG. 12.

Referring to FIG. 12, in step S3041, the character portion filling processing unit 30 acquires a character connected component included in the region to be filled with the character portion filling color.

More specifically, if the quantized region 2014 (FIG. 4) is to be subjected to the character portion filling processing, then the character portion filling processing unit 30 selects either one of the regions 20141 through 20143 as the character connected component. Then, the processing advances to step S3042.

In step S3042, the character portion filling processing unit 30 acquires the surrounding color connected component, which exists adjacent to and surrounding the character connected component to be processed. Then, the processing advances to step S3043. More specifically, the surrounding color connected component 20111 exists adjacent to the connected component 20141.

In step S3043, the character portion filling processing unit 30 determines whether only one surrounding color connected component exists adjacent to the connected component to be processed. If it is determined that only one surrounding color connected component exists adjacent to the connected component to be processed (YES in step S3043), then the processing advances to step S3044. On the other hand, if it is determined that two or more surrounding color connected component exist adjacent to the connected component to be processed (NO in step S3043), then the processing advances to step S3025.

More specifically, in the present exemplary embodiment, only one surrounding connected component, namely, the connected component 20111, surrounds the connected component 20141. Furthermore, only one connected component 20121 surrounds the connected component 20143. Accordingly, if the connected component 20141 or 20143 is to be processed, then the processing advances to step S3044.

On the other hand, in the present exemplary embodiment, two color connected components 20111 and 20121 surround the connected component 20142. In this case, the processing advances to step S3025.

In step S3044, the character portion filling processing unit 30 determines whether the quantized region, which is the origin of the surrounding color connected component, has the single-color background attribute. More specifically, in step S3044, the character portion filling processing unit 30 determines whether the quantized region that is the origin of the surrounding color connected component is a quantized region whose color change amount is small.

If it is determined that the quantized region has the single-color background attribute (YES in step S3044), then the processing advances to step S3024. On the other hand, if it is determined that the quantized region has the multicolor background attribute (NO in step S3044), then the processing advances to step S3025.

More specifically, if the connected component 20143 is to be processed, the connected component 20121 is the surrounding color connected component. In this case, the quantized region 2012 is the origin of the surrounding color connected component. Furthermore, the quantized region 2012 has the single-color background attribute. Accordingly, the processing advances to step S3024.

On the other hand, if the connected component 20141 is to be processed, the connected component 20111 is the surrounding color connected component. In this case, the quantized region 2011 is the origin of the surrounding color connected component. Furthermore, the quantized region 2011 has the multicolor background attribute. Accordingly, the processing advances to step S3025.

After having performed the processing in step S3024 or S3025, the processing advances to step S3045. In step S3045, the character portion filling processing unit 30 determines whether any unprocessed character pixel connected component remains within the region.

If it is determined that an unprocessed character pixel connected component remains within the region (YES in step S3045), then the processing returns to step S3041. In step S3041, the character portion filling processing unit 30 executes processing on a subsequent character connected component. On the other hand, if it is determined that no unprocessed character pixel connected component remains within the region (NO in step S3045), then the processing ends.

As described above, in the present exemplary embodiment, the method for determining the character portion filling color is changed according to the state of a surrounding connected component and the quantized region, which is the origin of the surrounding connected component, in the unit of a connected component.

A region which is not surrounded by a region having the single-color background attribute when determined in the unit of a region may be determined to be surrounded by a connected component having the single-color background attribute when determined in the unit of a connected component. In this case, the present exemplary embodiment can use the color of the quantized region as the character portion filling color.

Now, a third exemplary embodiment of the present invention will be described in detail below. In the above-described first and second exemplary embodiments, the character portion filling color is determined in the unit of a region or a character connected component. However, the present invention is not limited to this. More specifically, it is also useful if the method for determining the character portion filling color in the unit of a region or a character connected component in the same processing flow.

Figure 13:
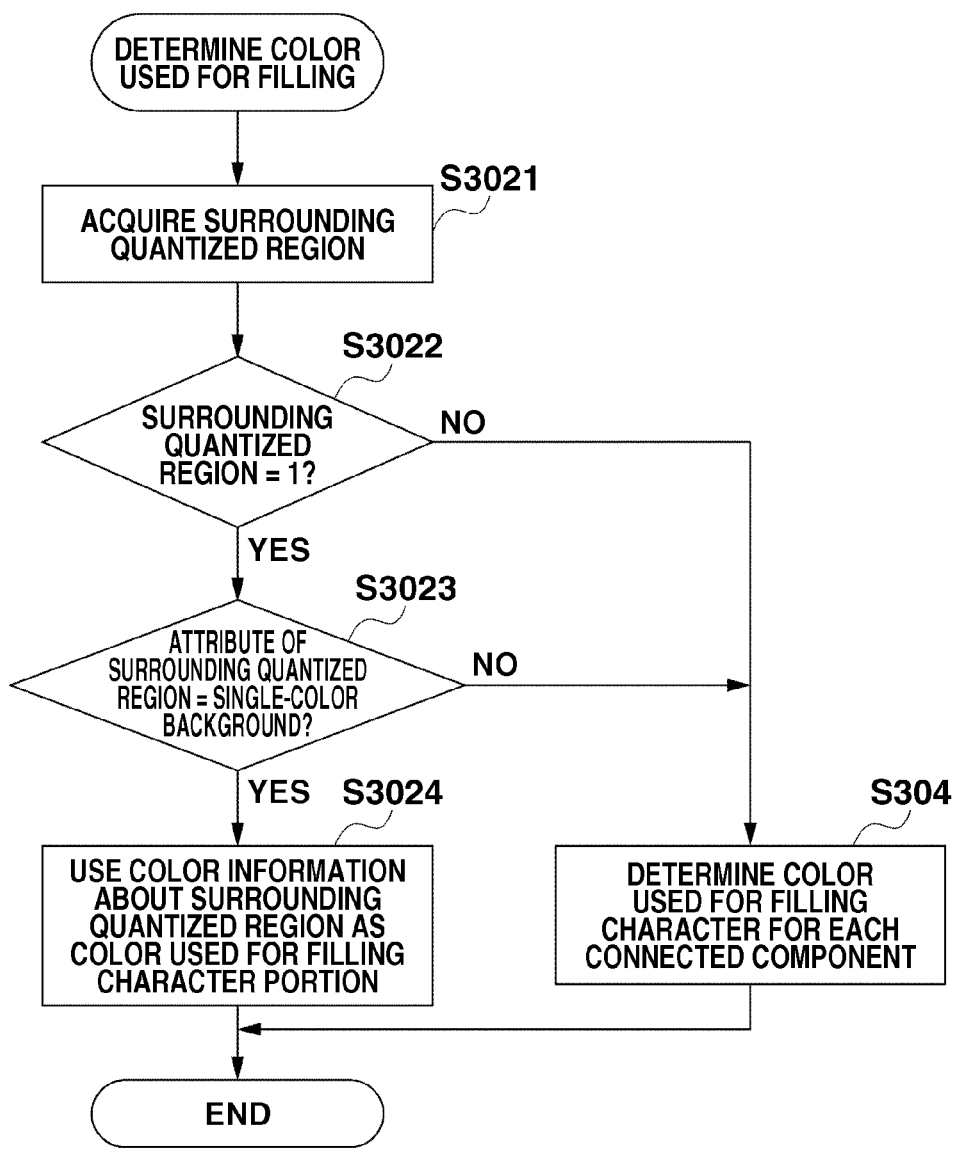
FIG. 13 is a flowchart illustrating an exemplary flow of character filling color determination processing according to a third exemplary embodiment of the present invention.

FIG. 13 is a flow chart illustrating an exemplary flow of character filling color determination processing according to the present exemplary embodiment.

Referring to FIG. 13, in steps S3021 through S3023, similar to the first exemplary embodiment, the character portion filling processing unit 30 executes the processing in the unit of a region and determines whether only one surrounding quantized region exists adjacent to the region and whether the surrounding quantized region has the single-color background attribute.

If it is determined that only one surrounding quantized region exists adjacent to the region (YES in step S3022) and that the surrounding quantized region has the single-color background attribute (YES in step S3023), then the processing advances to step S3024. In step S3024, the character portion filling processing unit 30 uses the color information about the surrounding quantized region as the character portion filling color.

On the other hand, if it is determined that two or more surrounding quantized regions exist adjacent to the region (NO in step S3022) or that the surrounding quantized region does not have the single-color background attribute (NO in step S3023), then the processing advances to step S304. In this case, the character portion filling processing unit 30 executes the processing in step S304, which is similar to that in the second exemplary embodiment described above.

More specifically, the present exemplary embodiment, in determining the character portion filling color, determines whether the character portion filling color can be determined based on the quantized region having the single-color background attribute in the unit of a text region. If it is determined that the character portion filling color cannot be determined based on the quantized region having the single-color background attribute in the unit of a text region, then the present exemplary embodiment determines the character portion filling color in the unit of a character connected component.

With the above-described configuration, each exemplary embodiment of the present invention can adaptively use the method for determining the character portion filling color by one operation at a high processing speed for each quantized region and the method for determining the character portion filling color for each connected component.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-149799 filed Jun. 24, 2009, which is hereby incorporated by reference herein in its entirety.

What is claimed is:

1. An image processing apparatus comprising:
a region analysis unit configured to generate a plurality of quantized regions by integrating regions that are included in an input multivalued image and have similar colors and to determine connected components included in each of the generated quantized regions, and to obtain region information of the connected components, the region information including attribute information, positional information, color information and surrounding relationship information of the connected components; and
a character portion filling unit configured to acquire the quantized regions adjacent to a connected component having a character attribute based on the region information, and to determine a color used for filling the connected component having the character attribute based on a count number, the attribute information and the color information of the acquired quantized regions, and to execute processing for filling the connected component having the character attribute based on the determined color, wherein the character portion filling unit is configured to change, based on the count number and the attribute information of the acquired quantized regions, a method for determining the color used for filling the connected component having the character attribute.

2. The image processing apparatus according to claim 1, wherein the character portion filling unit is configured, if only one quantized region exists adjacent to the connected component having the character attribute and the adjacent quantized region has a single-color background attribute, to determine a color of the adjacent quantized region as the color use for filling, and if a plurality of quantized regions exist adjacent to the connected component having the character attribute or if a quantized region existing adjacent to the connected component having the character attribute has a multicolor background attribute, the character portion filling unit is configured to determine an average color of pixels surrounding the connected component as the color used for filling.

3. The image processing apparatus according to claim 2, wherein the character portion filling unit is configured, if a plurality of quantized regions exist adjacent to the connected component having the character attribute, to segment the connected component based on the adjacent quantized region and to determine an average color of pixels surrounding the segmented connected components as the color used for filling.

4. The image processing apparatus according to claim 1, wherein the character portion filling unit is configured to change the method for determining the color used for filling for each quantized region including a plurality of connected components determined to have the character attribute.

5. The image processing apparatus according to claim 1, wherein the character portion filling unit is configured to change the method for determining the color used for filling for each connected component having the character attribute.

6. The image processing apparatus according to claim 1, wherein the character portion filling unit is configured to determine whether only one quantized region exists adjacent to the connected component having the character attribute and the adjacent quantized region has a single-color background attribute for each quantized region including a plurality of connected components having the character attribute, if it is determined that only one adjacent quantized region exists and the adjacent quantized region has the single-color background attribute, the character portion filling unit is configured to determine a color of the adjacent quantized region as the color used for filling, and if it is determined that a plurality of quantized regions exist adjacent to the connected component having the character attribute or the adjacent quantized region has a multicolor background attribute, the character portion filling unit is configured to change the method for determining the color used for filling according to a result of determination as to whether the count number of the adjacent quantized region is one and whether only one adjacent quantized region exists and the adjacent quantized region has the single-color background attribute.

7. The image processing apparatus according to claim 1, further comprising:

a vectorization processing unit configured to convert the connected component having the character attribute into vector data; and an electronic file generation unit configured to generate an electronic file including the vector data generated by the vectorization processing unit and an image whose character portion has been filled by the character portion filling unit.

8. An image processing method comprising:

generating a plurality of quantized regions by integrating regions that are included in an input multivalued image and have similar colors, and determining connected components included in each of the generated quantized regions, and obtaining region information of the connected components, the region information including attribute information, positional information, color information and surrounding relationship information of the connected components;

acquiring the quantized regions adjacent to a connected component having the character attribute based on the region information, and determining a color used for filling the connected component having the character attribute based on a count number, the attribute information and the color information of the acquired quantized regions, and executing processing for filling the connected component having the character attribute based on the determined color; and changing, based on the count number and the attribute information of the acquired quantized regions, a method for determining the color used for filling the connected component having the character attribute.

9. A non-transitory computer-readable storage medium storing instructions which, when executed by an image processing apparatus, cause the image processing apparatus to perform operations comprising:

generating a plurality of quantized regions by integrating regions that are included in an input multivalued image and have similar colors, and determining connected components included in each of the generated quantized regions, and obtaining region information of the connected components, the region information including attribute information, positional information, color information and surrounding relationship information of the connected components;

acquiring the quantized regions adjacent to a connected component having the character attribute based on the region information, and determining a color used for filling the connected component having the character attribute based on a count number, the attribute information and the color information of the acquired quantized regions, and executing processing for filling the connected component having the character attribute; and changing, based on the count number and the attribute information of the acquired quantized regions, a method for determining the color used for filling the connected component having the character attribute.

* * * * *